PULSE MODULATION FUNCTION MULTIPLIER

Filed Jan. 27, 1956 5 Sheets-Sheet 1

INVENTORS
WALTER W. KLEIN, JR.
WAYNE W. GRANNEMANN
OKE A. FREDRICKSSON
BY
ATTORNEYS

INVENTORS
WALTER W. KLEIN, JR.
WAYNE W. GRANNEMANN
OKE A. FREDRICKSSON
BY O. S. Loud,
Walter S. Madden Jr.
ATTORNEYS INVENTORS
WALTER W. KLEIN, JR.
WAYNE W. GRANNEMANN
OKE A. FREDRICKSSEN
BY O. S. Lond
Walter L. Madden, Jr.
ATTORNEYS Sept. 13, 1960 W. W. KLEIN, JR., ET AL 2,952,812

PULSE MODULATION FUNCTION MULTIPLIER

Filed Jan. 27, 1956 5 Sheets-Sheet 4

INVENTORS
WALTER W. KLEIN, JR.
WAYNE W. GRANNEMANN
OKE A. FREDRICKSSON

BY O. S. Lord
Walter J. Madden, Jr.
ATTORNEYS

INVENTORS
WALTER W. KLEIN, JR.
WAYNE W. GRANNEMANN
OKE A. FREDRICKSSON
BY O. L. Loud
Walter J. Madden Jr.
ATTORNEYS 2,952,812

PULSE MODULATION FUNCTION MULTIPLIER

Walter W. Klein, Jr., Anaheim, and Wayne W. Grannemann and Oke A. Fredriksson, Fullerton, Calif., assignors to California Research Corporation, San Francisco, Calif., a corporation of Delaware Filed Jan. 27, 1956, Ser. No. 561,800

6 Claims. (Cl. 328—172)

Figure 1:
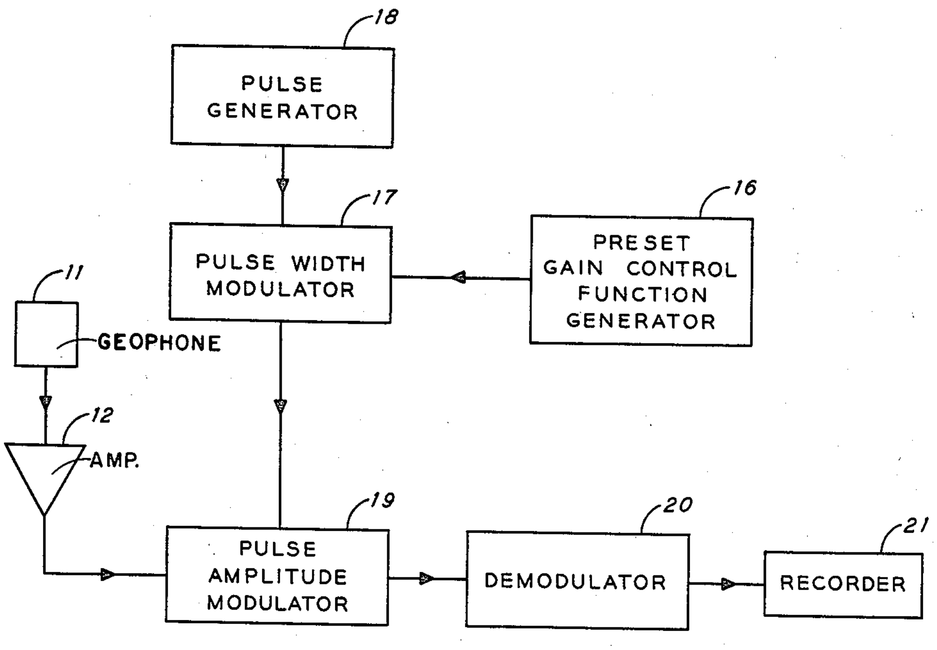

This invention relates in general to networks for multiplying together two or more functions which can be represented by electrical signals. There are numerous applications where it is desired to perform such multiplication, and the multiplication is preferably accomplished with a minimum of required equipment and with a minimum resultant distortion. One of such applications is the amplifying of seismic detector signals, a field in which the present invention is particularly useful, although not necessarily limited. The most common types of gain control for such amplification are the closed feedback loop and the preset or predetermined gain control in which the gain is varied as some predetermined function of time. In the closed feedback loop system, diode lossers are usually utilized in a bridge circuit in which the voltage across the lossers, and hence the impedance thereof, is varied as a function of the amplitude of the output signal. These impedance variations of the diodes are utilized to vary the amplification or attenuation of the controlled signal so as to maintain this amplitude within predetermined limits. However, the use of such diode lossers has the disadvantages that the speed of reaction of such diodes is limited, so that there is an objectional lag in the response of the circuit. Additionally, the D.C. shift inherent in these diodes frequently causes severe distortion. Further, in order to obtain accurate gain control action with diode lossers, the diodes must be accurately matched as to their characteristics, thus requiring that each pair of diodes be especially selected for matching characteristics.

Broadly the present invention contemplates methods and apparatus for multiplying two or more electrical functions together utilizing various combinations of pulse modulation. Where the functions to be multiplied are a control function and a controlled function, the control function is utilized to modulate a series of pulses in a first predetermined manner to produce a first modulated pulse train. This first modulated pulse train is further modulated in a different manner in accordance with the signal to be controlled to produce a dual modulated pulse train which is a function of both the control function and the controlled signal. The dual modulated pulse train may then be demodulated in a single demodulator to produce a signal corresponding to the controlled signal as modified by the control function.

In a representative embodiment of the present invention, a series of pulses is pulse width modulated in accordance with the control function. In the case of seismic detector signals, this control function may be either a preset gain control signal or a measure of the amplitude of the amplified seismic detector signal from a closed feedback loop. The control function thus modulates the series of pulses to produce a pulse train comprising variable width, constant amplitude pulses. This pulse train may then be amplitude modulated in accordance with the amplitude of the controlled signal to produce a dual modulated pulse train of variable pulse width and variable pulse amplitude. This dual modulated pulse train is then demodulated in a suitable network, such as a simple resistance-capacitance integration network. Such a network produces an output signal approximately proportional to the area of the pulses so that the output signal is an effective measure of the controlled signal as modified by the control function.

Similarly, other pulse modulation methods, such as pulse frequency modulation, may be utilized in combination with either pulse width or pulse amplitude modulation to produce the desired dual modulated pulse train. Additionally, a triple modulated pulse train may be produced by utilizing combinations of pulse width, pulse amplitude and pulse frequency modulation to modulate a controlled signal in response to two control functions.

It is therefore an object of the present invention to provide improved methods and apparatus for multiplying two or more functions which can be expressed as electrical signals.

It is a further object of this invention to provide methods and apparatus for multiplying two or more functions in which the functions to be multiplied modulate a series of pulses to produce a modulated pulse train which is demodulated to produce a resultant signal representing the product of the desired multiplication.

It is an additional object of the present invention to provide improved methods and apparatus for automatically controlling the amplitude of a variable amplitude electrical signal in accordance with a control function.

It is a further object of the present invention to provide methods and apparatus for controlling the amplitude of a variable amplitude electrical signal in accordance with a control function in which a series of pulses is modulated in a first manner in accordance with the control function to produce a first modulated pulse train, and this first modulated pulse train is further modulated in accordance with the variable amplitude signal to produce a dual modulated pulse train, and this dual modulated pulse train is demodulated to produce a signal corresponding to the variable amplitude electrical signal as modified by the control function.

It is a further object of the present invention to provide methods and apparatus for controlling the amplitude of a variable amplitude electrical signal in accordance with a control function in which a series of pulses is width modulated in accordance with the control function to produce a first modulated pulse train and this first modulated pulse train is amplitude modulated in accordance with the variable amplitude signal to produce a dual modulated pulse train, and this dual modulated pulse train is demodulated to produce a signal corresponding to the variable amplitude electrical signal as modified by the control function.

It is a further object of the present invention to provide methods and apparatus for controlling the amplitude of a variable amplitude electrical signal in accordance with a control function in which a series of pulses is frequency modulated in accordance with the control function to produce a first modulated pulse train and this first modulated pulse train is amplitude modulated in accordance with the variable amplitude signal to produce a dual modulated pulse train, and this dual modulated pulse train is demodulated to produce a signal corresponding to the variable amplitude electrical signal as modified by the control function.

It is a further object of the present invention to provide methods and apparatus for controlling the amplitude of a variable amplitude electrical signal in accordance with a control function in which a series of pulses is amplitude modulated in accordance with the control function to produce a first modulated pulse train and this first modulated pulse train is width modulated in accordance with the variable amplitude signal to produce a dual modulated pulse train, and this dual modulated pulse train is demodulated to produce a signal corresponding to the variable amplitude electrical signal as modified by the control function.

It is a further object of the present invention to provide methods and apparatus for controlling the amplitude of a variable amplitude electrical signal in accordance with a control function in which a series of pulses is frequency modulated in accordance with the control function to produce a first modulated pulse train and this first modulated pulse train is width modulated in accordance with the variable amplitude signal to produce a dual modulated pulse train, and this dual modulated pulse train is demodulated to produce a signal corresponding to the variable amplitude electrical signal as modified by the control function.

Figure 3:
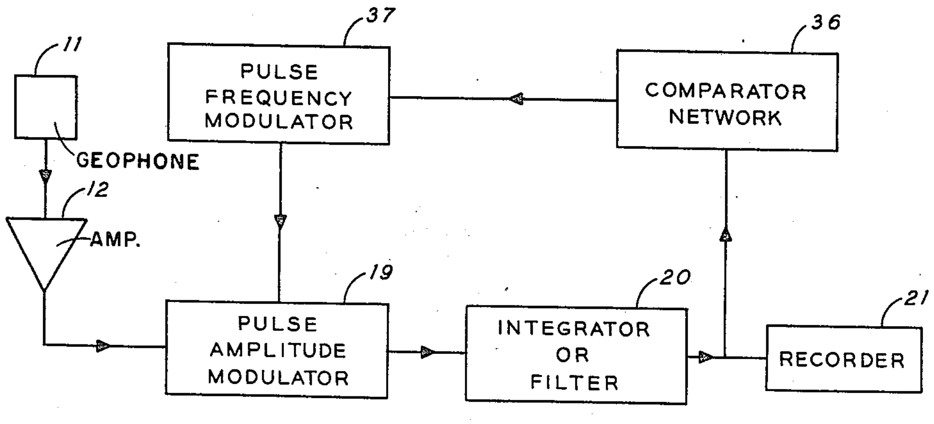
Figure 5:
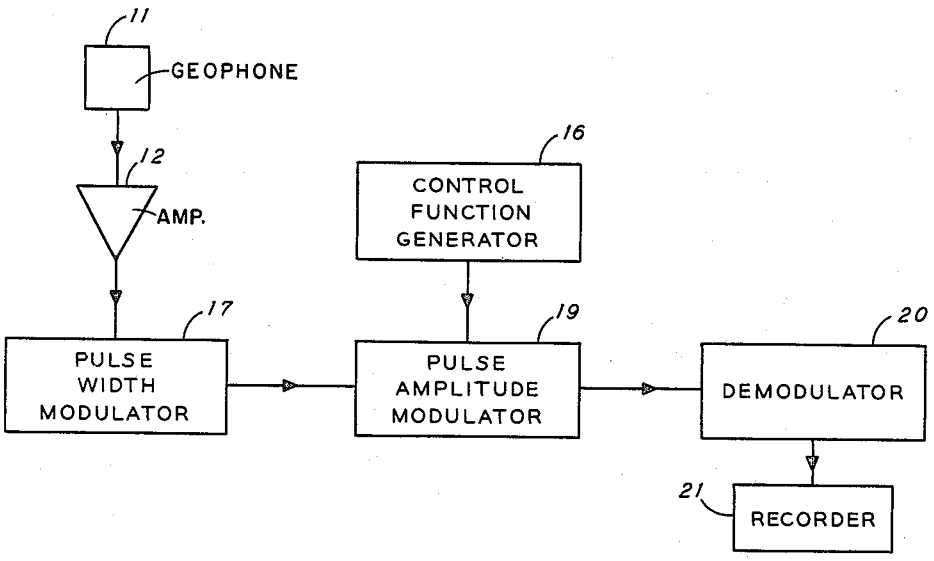
Figure 6:
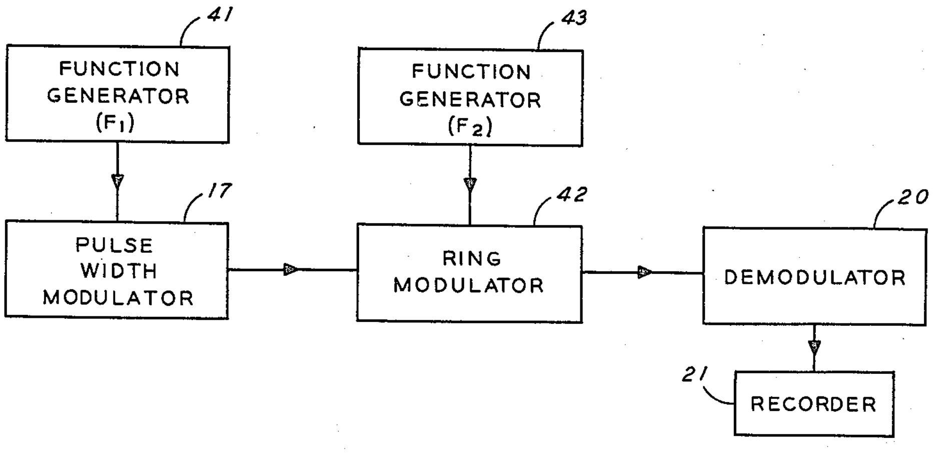

Objects and advantages other than those set forth above will be apparent from the following description when read in connection with the accompanying drawings, in which:

Fig. 1 schematically illustrates one embodiment of the present invention utilizing pulse width and pulse amplitude modulation;

Fig. 2 is a series of curves representing the wave forms resulting from the operation of the embodiment of Fig. 1 on a representative signal and a representative control function;

Fig. 3 schematically illustrates an alternate embodiment of the present invention utilizing pulse frequency and pulse amplitude modulation;

Fig. 4 is a series of curves representing the wave forms resulting from the operation of the embodiment of Fig. 3 on a representative signal and a representative control function;

Fig. 5 schematically illustrates an alternate embodiment of the present invention utilizing pulse width modulation of the controlled signal and pulse amplitude modulation of the control function;

Fig. 6 schematically illustrates an alternate embodiment of the present invention for performing multiplication of two functions; and Fig. 7 is a series of curves representing the wave forms resulting from the operation of the embodiment of Fig. 6 in the multiplication of two identical sinusoidal functions.

Referring to Fig. 1 by character of reference, numeral 11 designates a source which produces the variable amplitude electrical signal which is to be controlled. Such a device may be of any suitable type, and in the present embodiment and its application to seismic detector signals, it will be assumed that device 11 is a seismic wave detector which produces an electrical signal having an amplitude varying in response to the movement of the earth. The output signal from device 11 is supplied through an amplifier 12 to a portion of the modulating system of the present invention. The output signal from device 11 may be controlled in response to any suitable control function. For example, such control function may be generated in response to the amplitude of the seismic detector signal so as to maintain this amplitude within predetermined limits. Alternatively, the control function may be in the form of a preset or predetermined gain control, in which case the control function varies in a predeterminable manner as a function of time.

As is well known in the seismic art, the amplitude of the seismic detector signal normally tends to be largest immediately after the seismic disturbance and then decreases as the disturbance energy dissipates in the earth. Therefore, a representative control function in a preset gain control system would tend to amplify the latter portions of the seismic signal more than the earlier portions. Such a control function could be generated, for example, by a network designated by reference character 16 which generates an electrical output signal whose amplitude varies in dependence upon the desired amplification of the seismic signal. The output from network 16 is supplied to a pulse width modulation network 17. Pulse width modulation network 17 receives another input in the form of a series of uniform-amplitude, uniform-width pulses from a pulse generating network 18. This series of pulses is modulated in width in network 17 by the control function signal from network 16 to produce a first pulse train comprising width-modulated pulses. The pulse modulation may be done by modulating either the leading edge, the trailing edge, or both. Such modulators are well known in the art and may utilize an amplified and clipped sawtooth or triangular signal.

This width-modulated pulse train from network 17 is supplied as an input to a pulse-amplitude modulation network 19. The modulating input to pulse amplitude modulator 19 is supplied from amplifier 12 so that the width-modulated pulse train from modulator 17 is amplitude modulated in network 19 by the controlled signal. Amplitude modulator 19 preferably modulates both positively and negatively about a constant reference point to avoid a D.C. shift when the gain control signal varies abruptly. The output from pulse amplitude modulator 19 thus is a dual modulated pulse train comprising the width-modulated pulse train from network 17 as amplitude modulated by the controlled signal. This dual modulated pulse train is supplied to a suitable demodulation network 20, such as a simple resistive-capacitive network, which produces an output signal approximately proportional to the area of the input pulses. The output signal from demodulator 20 is supplied to a suitable recording device 21.

The operation of the embodiment of Fig. 1 may be more apparent from a study of the graphs in Fig. 2, which illustrate the wave forms involved in different portions of the circuit of Fig. 1 in connection with a representative controlled signal and control function. Fig. 2*a* is a plot of a hypothetical seismic detector signal plotted as a function of time. The curve of Fig. 2*a* is somewhat simplified with respect to an actual seismic detector signal, but it is sufficiently representative to indicate the operation of the present invention. The curve of Fig. 2*b* is a plot of a representative control function such as would be utilized in connection with a preset or predetermined gain control for a seismic detector signal. The amplitude of the curve of Fig. 2*b* is a measure of the suppression or attenuation which it is desired to introduce into the seismic signal. Thus this curve starts out at a maximum value and decreases as a function of time.

Figure 2A:
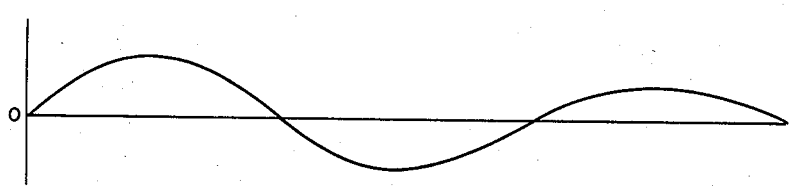
Figure 2B:
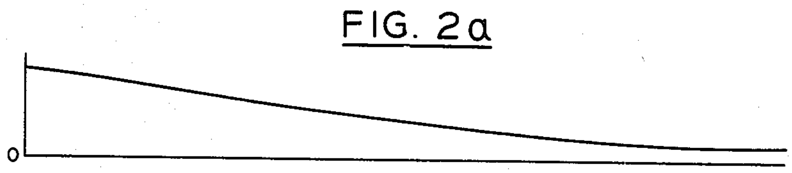
Figure 2C:
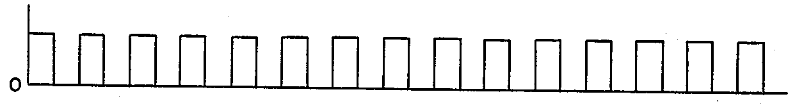

Fig. 2*c* represents the constant-amplitude, constant-width output pulse series from pulse generator 18. The repetition frequency of the pulses from pulse generator 18 should be at least 10 times the highest frequency present in the signal to be controlled. The pulse series should similarly have a frequency at least ten times as high as the highest frequency present in the control function signal, although in the case of seismic amplifying systems the control function is normally a very low frequency signal so that the frequency of the seismic detector signal itself is the controlling factor in connection with the frequency of pulse generator 18.

Figure 2D:

Fig. 2*d* represents the output pulse train from pulse-width modulator 17, the width of the pulses progressively increasing as a function of time in response to the width modulation action of the signal represented in Fig. 2*b*.

Figure 2E:
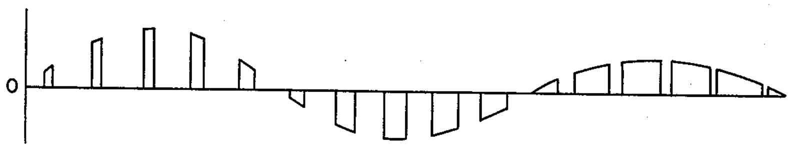

Fig. 2*e* represents the output signal from pulse amplitude modulator 19, this output comprising the width modulated pulse train shown in Fig. 2*d* as amplitude modulated both positively and negatively by the seismic detector signal represented by the curve of Fig. 2*a*. This dual modulated pulse train from amplitude modulator 19 thus comprises a series of variable amplitude, variable width pulses.

Figure 2F:
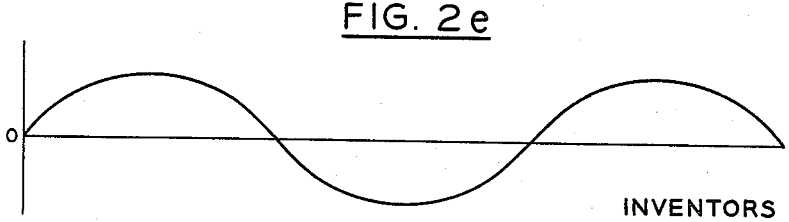
Figure 4A:
Figure 4B:
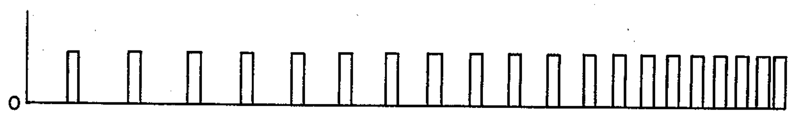
Figure 4C:
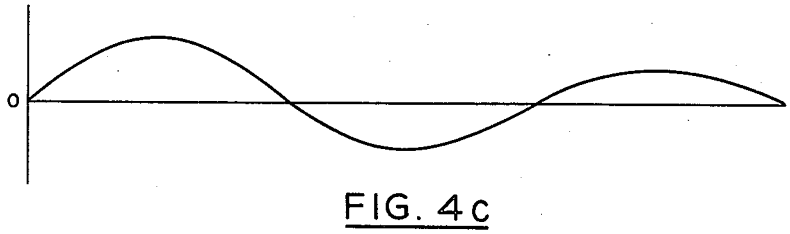
Figure 4D:
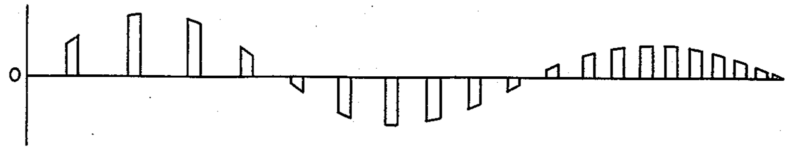
Figure 4E:
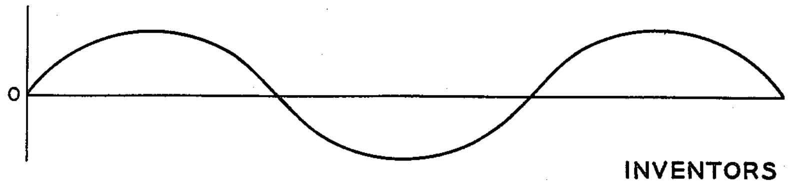

The curve in Fig. 2*f* represents the output of demodulator 20, the amplitude of this curve being proportional to the area of the corresponding pulses in the pulse train shown in Fig. 2*e*. The curve of Fig. 2*f* represents the original signal represented in Fig. 2*a* as modified by the desired gain control action represented by the curve of Fig. 2*b*, thus indicating that the present invention acts as a true multiplier.

Fig. 3 illustrates an alternate embodiment of the present invention in which a different combination of types of modulation is utilized to modify the controlled signal in response to a control function. In Fig. 3, assuming the application of the present invention to the amplification of seismic signals in a manner similar to that shown in Fig. 1, the output from seismic detector 11 is supplied through amplifier 12 to the modulating input of pulse amplitude modulator 19 as before. The control function may be generated as before from a preset gain control generation network, or alternatively, the control function may be generated in an automatic gain control closed loop feedback type circuit. In the latter case, a comparator network 36 may be provided for producing an output signal which is a measure of the deviation of the amplitude of the controlled signal from the desired value. Such networks are well known in the amplifier art and may comprise a suitable reference source with which a measure of the controlled signal is compared to produce a difference signal indicative of the deviation of the controlled signal from the desired value.

The output from network 36, representing the control function, is supplied as the modulating input to a pulse frequency modulator 37. The control function thus modulates the frequency of the pulses generated in network 37 to produce an output from network 37 comprising a train of variable frequency pulses. This pulse train from network 37 is supplied to pulse amplitude modulator 19 where it is amplitude modulated in accordance with the amplitude of the seismic detector signal from amplifier 12. The output from pulse amplitude modulator 19 thus comprises a train of variable frequency, variable amplitude pulses. This dual modulated pulse train is demodulated in demodulator 20 and the output thereof, corresponding to the controlled signal as modified by the control function, is supplied to recorder 21.

The curves of Fig. 4 represents the wave forms resulting from the operation of the embodiment of Fig. 3 on a hypothetical seismic detector signal and a hypothetical control function. Fig. 4*a* is a graph of the control function plotted as a function of time, and represents the desired suppression or attenuation of the seismic detector signal. Fig. 4*b* represents the output of pulse frequency modulator 37 comprising a train of constant amplitude, variable frequency pulses as modulated by the control function of Fig. 4*a*. Fig. 4*c* is a plot of the seismic detector signal as a function of time and is similar to the hypothetical signal shown in Fig. 2*a*. The pulse train of Fig. 4*b* is modulated in pulse amplitude modulator network 19 by the signal represented in Fig. 4*c* to produce an output from modulator 19 corresponding to that represented in Fig. 4*d*. The dual modulated pulse train from pulse amplitude modulator 19 is demodulated in demodulation network 20 to produce an output corresponding to that shown in Fig. 4*e* and representing the controlled signal as modified by the control function. It will be seen that the curve of Fig. 4*e* corresponds to the original input signal shown in Fig. 4*c* as modified by the control function of Fig. 4*a*.

As an additional refinement of the present invention, three different types of modulation may be utilized to produce a triple modulated pulse train. For example, in the amplification of seismic detector signals it may be desirable to control the gain of the signal on the basis of a closed loop automatic gain control and a preset or predetermined gain control. In such an instance the two control functions, representing the closed loop automatic gain control and the preset gain control, can be used to produce two different types of modulation on a series of pulses, and the resultant dual modulated pulse train can be modulated in a third manner by the amplitude of the seismic detector signal itself to produce a triple modulated pulse train representing the seismic detector signal as modified by the two control functions. This latter embodiment could be constructed, for example, by utilizing apparatus similar to that shown in Fig. 1, with the pulse generator 18 replaced by a pulse frequency modulator whose output is modulated in accordance with the closed loop automatic gain control function.

Fig. 5 illustrates an alternate embodiment of the present invention in which the roles of the modulators are reversed with respect to their functions in the embodiment of Fig. 1. In Fig. 5 the output from seismic detector 11 is supplied through amplifier 12 to the modulating input of pulse width modulator 17. The seismic detector signal thus modulates the width of the pulses in the pulse series to produce an output from modulator 17 comprising a first pulse train of width-modulated pulses. This first pulse train is supplied as the input to pulse amplitude modulator 19, which receives a modulating input in accordance with the control function. This control function may be an automatic gain control signal as shown in the embodiment of Fig. 3, or alternatively, it may be from a preset gain control function generator 16 similar to function generator 16 of Fig. 1. The control function from control function generator 16 amplitude-modulates the first pulse train in modulator 19 to produce an output from modulator 19 comprising a dual modulated pulse train. This dual modulated pulse train is demodulated in demodulator 20 and supplied to recorder 21.

The wave forms associated with the different elements of the embodiment of Fig. 5 are not shown, but their shape may be readily inferred from the wave forms shown in Fig. 2 and by considering that in the embodiment of Fig. 5 the roles of the pulse width modulator and pulse amplitude modulator are merely reversed with respect to their roles in the embodiment of Fig. 1.

As stated above, the present invention is actually a multiplying system for multiplying two or more functions which can be expressed electrically. In the preceding discussion of the embodiments of Figs. 1, 3 and 5, the invention was illustrated in connection with controlling the amplification of a seismic detector signal in response to a gain control signal of some sort. The present invention is extremely useful in this particular application, owing to its high response speed and low distortion. However, it will be understood that the present invention has numerous other applications to the multiplication of two or more functions which can be expressed as electrical signals.

Fig. 6 schematically illustrates one embodiment of the present invention suitable for use in the multiplication of two functions. Reference character 41 designates a network for generating a first electrical signal corresponding to one of the functions to be multiplied. The electrical output from function generator 41 is supplied as the modulating input to pulse width modulator 17. The pulse width modulated output pulse train from modulator 17 is supplied in turn as the modulated input to a ring modulator 42. Ring modulator 42 receives a modulating input from a function generator 43 which generates an electrical signal corresponding to the second function to be multiplied. Ring modulator 42, sometimes called a synchronous demodulator, serves to amplitude modulate the pulse train in accordance with the second function to be multiplied and to control the phase of the modulated pulse train, producing an inversion each time the second function reverses polarity. The output from ring modulator 42 is supplied to demodulator 20 where the signal is demodulated and supplied to recorder 21.

The wave forms of Fig. 7 illustrate the operation of the embodiment of Fig. 6 in the multiplication of two functions. Figs. 7*a* and 7*b* are curves representing the two functions to be multiplied, Fig. 7*a* representing the first function, $F_1$, and Fig. 7*b* representing the second function, $F_2$. For simplicity, the two functions have been shown as equal sine waves represented by the equation $$F_3 = K_2\ (1-\cos 2\omega t$$

where $K_1$ is a constant. Fig. 7*c* illustrates the wave form of the ouput from pulse width modulator 17 in Fig. 6 and comprises a first width modulated pulse train which has been modulated in accordance with the curve of Fig. 7*a*. It will be noted that the output of pulse width modulator 17 is modulated both positively and negatively.

Figure 7A:
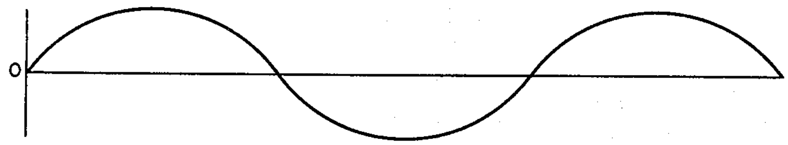
Figure 7B:
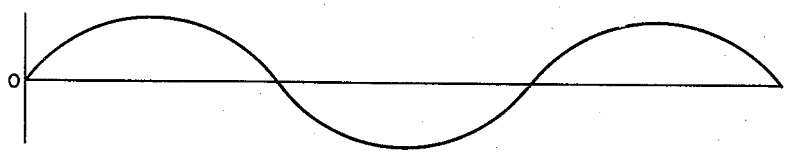
Figure 7C:
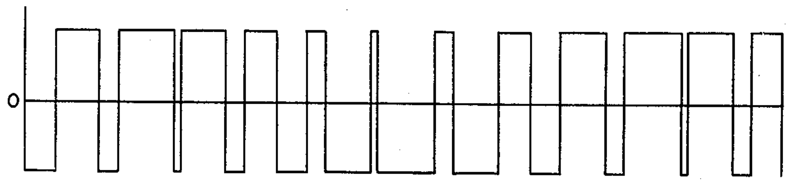
Figure 7D:
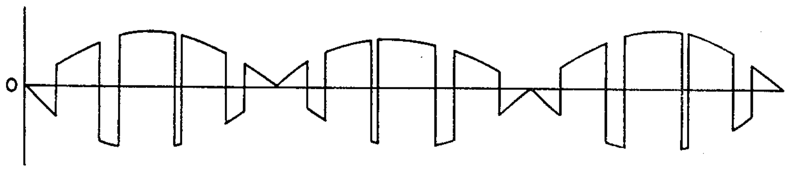
Figure 7E:
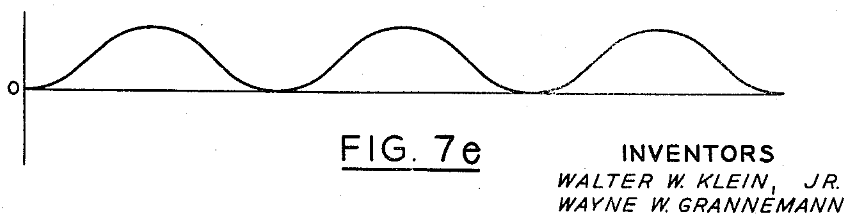

Fig. 7*d* represents the output of ring modulator 42 and comprises the width modulated pulse train of Fig. 7*c* as amplitude modulated by the function represented in Fig. 7*b*. Thus the output of ring modulator 42 comprises a dual modulated pulse train, this pulse train again being modulated both negatively and positively. The signal represented by the curve of Fig. 7*d* is demodulated in demodulator 20 to produce the wave form shown by the curve of 7*e*. It will be seen from a comparison of Figs. 7*a* and 7*b* with Fig. 7*e* that the device has performed a true polarity-sensitive multiplication of the two functions, the resultant product of Fig. 7*e* alternately varying in value from zero to a positive maximum value. The output of ring modulator 42, which output may be represented as $F_3$, is given by the equation $$F_3 = K_2\ (1-\cos 2\omega t)$$

where $K_2$ is a constant.

Although but a few embodiments of the present invention have been illustrated and described, it will be apparent to those skilled in the art that various changes and modifications may be made therein without departing from the spirit of the invention or the scope of the appended claims:

We claim:

1. Apparatus for controlling the amplitude of an electrical seismic detector signal to maintain said amplitude within predetermined limits comprising a comparator network energized by a measure of said detector signal for generating an error signal which is a measure of the deviation of the amplitude of said seismic detector signal from said predetermined limits, a pulse generating network for generating a series of rectangular pulses, a first pulse modulating network for modulating a first characteristic of said pulses in accordance with said error signal to produce a first modulated pulse train, a second pulse modulating network, means for supplying said first modulated pulse train as a modulated input to said second pulse modulating network, means for supplying said seismic detector signal as the modulating input to said second network to modulate a second characteristic different from said first characteristic of said first modulated pulse train in accordance with the amplitude of said seismic detector signal to produce a dual modulated pulse train, and means for demodulating said duel modulated pulse train to produce a measure of said seismic detector signal having an amplitude within said predetermined limits.

2. Apparatus for controlling the amplitude of an electrical seismic detector signal to maintain said amplitude within predetermined limits comprising a comparator network energized by a measure of said detector signal for generating an error signal which is a measure of the deviation of the amplitude of said seismic detector signal from said predetermined limits, a pulse generating network for generating a series of rectangular pulses, a first pulse modulating network for modulating the frequency of said pulses in accordance with said error signal to produce a frequency modulated pulse train, a second pulse modulating network, means for supplying said frequency modulated pulse train as a modulated input to said second pulse modulating network, means for supplying said seismic detector signal as the modulating input to said second network to modulate the amplitude of said frequency modulated pulse train in accordance with the amplitude of said seismic detector signal to produce a dual modulated pulse train, and means for demodulating said dual modulated pulse train to produce a measure of said seismic detector signal having an amplitude within said predetermined limits.

3. Apparatus for controlling the amplitude of an electrical seismic detector signal to maintain said amplitude within predetermined limits comprising a comparator network energized by a measure of said detector signal for generating an error signal which is a measure of the deviation of the amplitude of said seismic detector signal from said predetermined limits, a pulse generating network for generating a series of rectangular pulses, a first pulse modulating network for modulating the amplitude of said pulses in accordance with said error signal to produce an amplitude modulated pulse train, a second pulse modulating network, means for supplying said amplitude modulated pulse train as a modulated input to said second pulse modulating network, means for supplying said seismic detector signal as the modulating input to said second network to modulate the frequency of said amplitude modulated pulse train in accordance with the amplitude of said seismic detector signal to produce a dual modulated pulse train, and means for demodulating said dual modulated pulse train to produce a measure of said seismic detector signal having an amplitude within said predetermined limits.

4. Apparatus for controlling the amplitude of an electrical seismic detector signal to maintain said amplitude within predetermined limits comprising a comparator network energized by a measure of said detector signal for generating an error signal which is a measure of the deviation of the amplitude of said seismic detector signal from said predetermined limits, a pulse generating network for generating a series of rectangular pulses, a first pulse modulating network for modulating the width of said pulses in accordance with said error signal to produce a width modulated pulse train, a second pulse modulating network, means for supplying said width modulated pulse train as a modulated input to said second pulse modulating network, means for supplying said seismic detector signal as the modulating input to said second network to modulate the amplitude of said width modulated pulse train in accordance with the amplitude of said seismic detector signal to produce a dual modulated pulse train, and means for demodulating said dual modulated pulse train to produce a measure of said seismic detector signal having an amplitude within said predetermined limits.

5. Apparatus for controlling the amplitude of an electrical seismic detector signal to maintain said amplitude within predetermined limits comprising a comparator network energized by a measure of said detector signal for generating an error signal which is a measure of the deviation of the amplitude of said seismic detector signal from said predetermined limits, a pulse generating network for generating a series of rectangular pulses, a first pulse modulating network for modulating the width of said pulses in accordance with said error signal to produce a width modulated pulse train, a second pulse modulating network, means for supplying said width modulated pulse train as a modulated input to said second pulse modulating network, means for supplying said seismic detector signal as the modulating input to said second network to modulate the frequency of said width modulated pulse train in accordance with the amplitude of said seismic detector signal to produce a dual modulated pulse train, and means for demodulating said dual modulated pulse train to produce a measure of said seismic detector signal having an amplitude within said predetermined limits.

6. Apparatus for controlling the amplitude of an electrical seismic detector signal to maintain said amplitude within predetermined limits comprising a pulse generating network for generating a series of rectangular pulses, a first pulse modulating network for modulating a first characteristic of said pulses in accordance with the amplitude of said detector signal to produce a first modulated pulse train, a second pulse modulating network, means for supplying said first modulated pulse train as a modulated input to said second pulse modulating network, a comparator network energized by a measure of said detector signal for generating an error signal which is a measure of the deviation of the amplitude of said seismic detector signal from said predetermined limits, means for supplying said error signal as the modulating input to said second network to modulate a second characteristic different from said first characteristic of said first modulated pulse train in accordance with said error signal to produce a dual modulated pulse train, and means for demodulating said dual modulated pulse train to produce a measure of said seismic detector signal having an amplitude within said predetermined limits.

References Cited in the file of this patent

UNITED STATES PATENTS

| | | |
|---|---|---|
| 2,464,874 | Labin et al. | Mar. 1, 1949 |
| 2,557,194 | Milsom | June 19, 1951 |
| 2,575,993 | Bennett et al. | Nov. 20, 1951 |
| 2,593,395 | Sziklai | Apr. 15, 1952 |
| 2,710,348 | Baum et al. | June 7, 1955 |
| 2,743,421 | Meyer | Apr. 24, 1956 |
| 2,760,189 | McCoy et al. | Aug. 21, 1956 |

OTHER REFERENCES

RCA Review, vol. 13, September 1952, No. 3, pp. 265–274, "A High Accuracy Time-Division Multiplier" by Edwin A. Goldberg.

UNITED STATES PATENT OFFICE

CERTIFICATE OF CORRECTION

Patent No. 2,952,812 September 13, 1960

Walter W. Klein Jr., et al.

It is hereby certified that error appears in the printed specification of the above numbered patent requiring correction and that the said Letters Patent should read as corrected below.

Column 4, line 7, after "pulse" insert -- width --, line 61, for "width", second occurrence, read -- widths --; column 5, line 42, for "represents" read -- represent --; column 7, line 4, the equation should appear as shown below instead of as in the patent:

$$F_1 = F_2 \mp K_1 \sin \omega t$$

Signed and sealed this 25th day of April 1961.

(SEAL)
Attest:

ERNEST W. SWIDER
Attesting Officer

DAVID L. LADD
Commissioner of Patents